July 4, 1972  G. GAZUIT  3,674,604
TIRE BUILDING DRUM
Filed Nov. 17, 1969  3 Sheets-Sheet 1
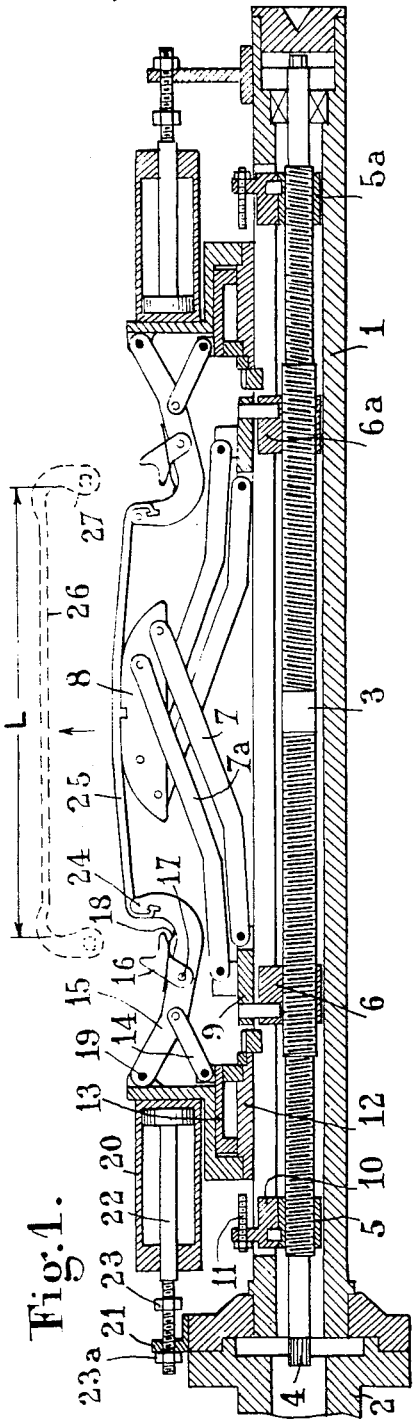
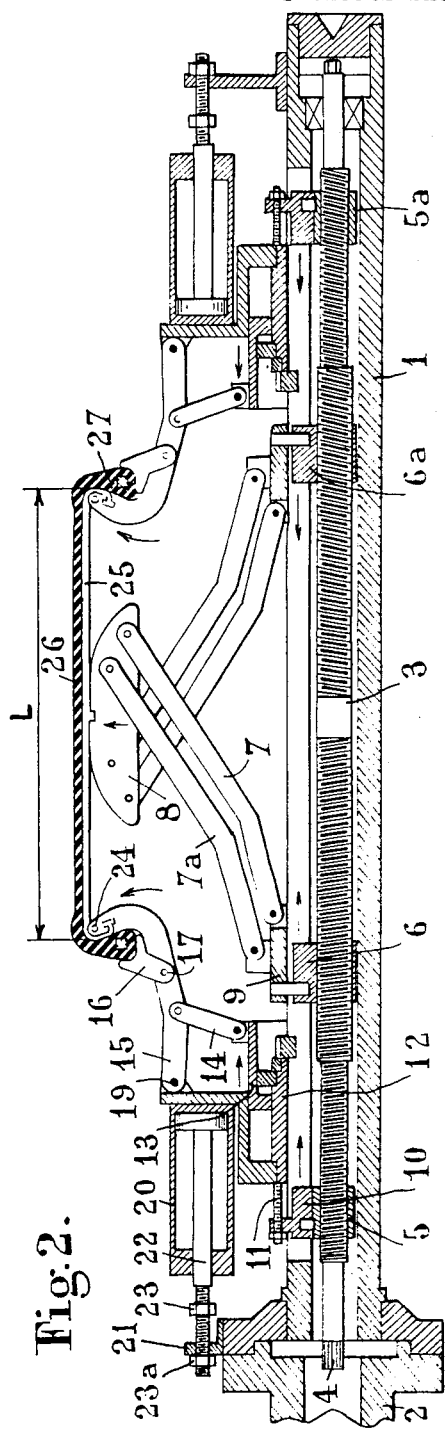
INVENTOR
GEORGES GAZUIT
Oberlin, Maky, Donnelly & Renner
ATTORNEYS

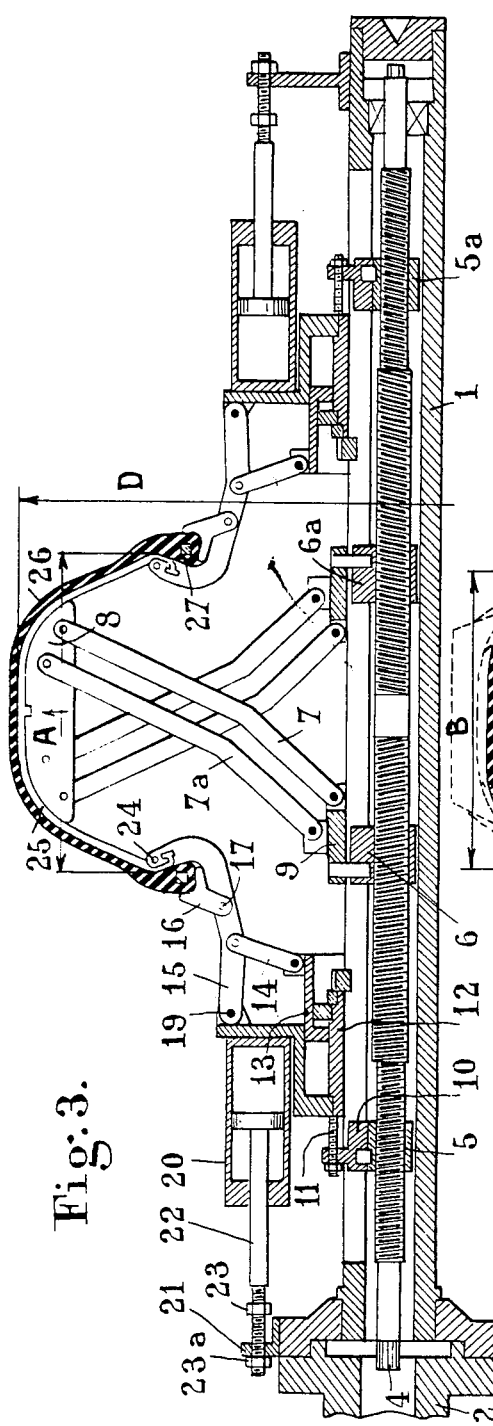
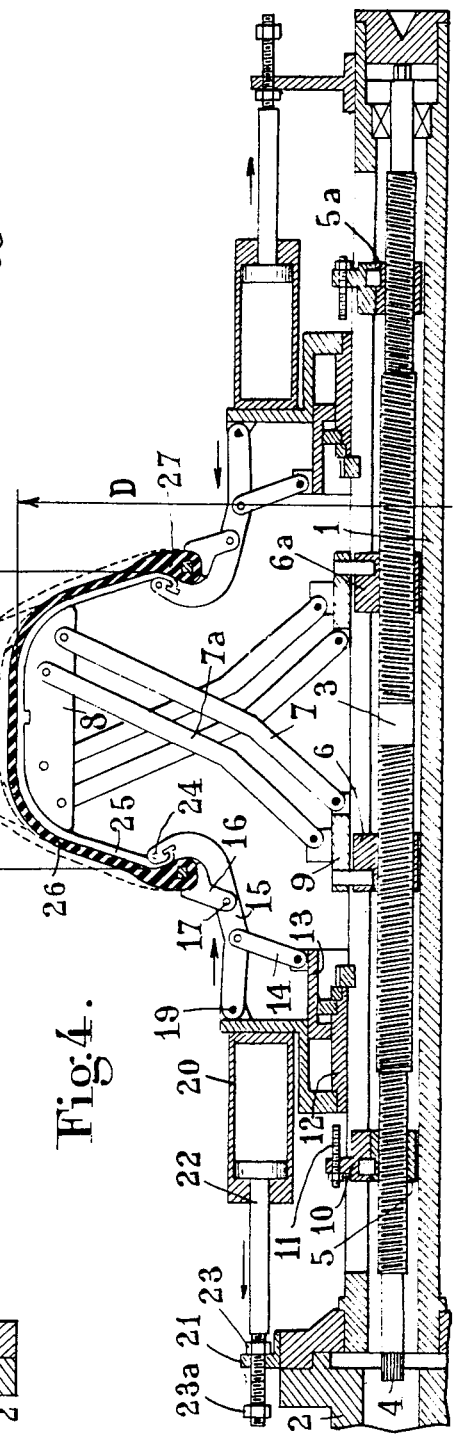

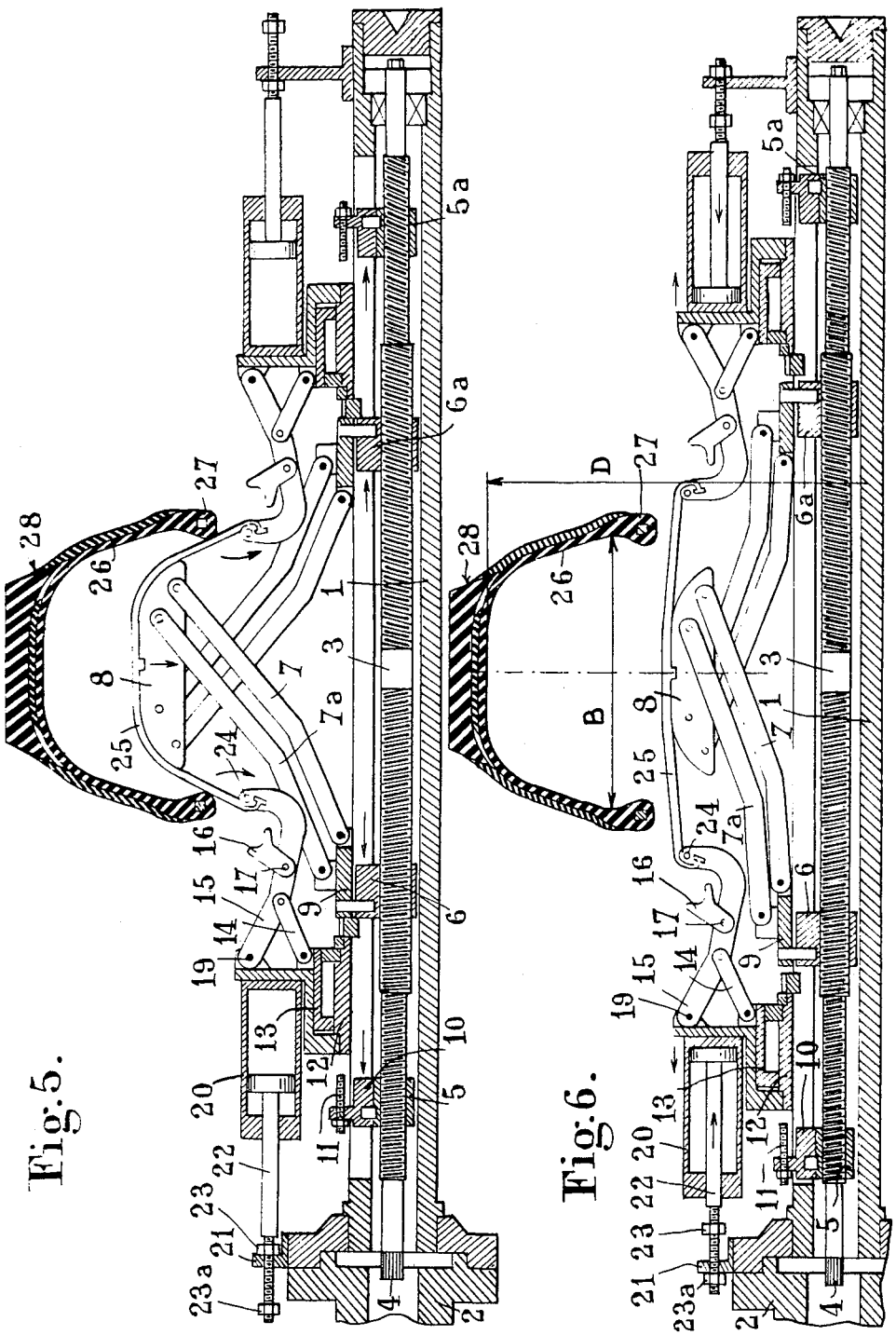

United States Patent Office 3,674,604
Patented July 4, 1972

3,674,604
TIRE BUILDING DRUM
Georges Gazuit, Montlucon, France, assignor to
NRM Corporation, Akron, Ohio
Filed Nov. 17, 1969, Ser. No. 877,400
Claims priority, application France, Nov. 27, 1968,
175,508
Int. Cl. B29h *17/16, 17/26*
U.S. Cl. 156—415        13 Claims

ABSTRACT OF THE DISCLOSURE

In this Rind-type drum for making tires described in my co-pending application Ser. No. 617,658 now abandoned in favor of applicant's continuation application Ser. No. 28,281, filed Apr. 22, 1970, entitled "Tire Building Machine," the bead clamping means consist for each flange supporting same of an annular set of pivoted arms each formed with an outer end bent radially away from the drum axis, this end carrying a pivoted finger formed with a forked outer end and radially urged away from the drum axis by a spring reacting against said arm, and a link connecting said arm to the movable end of a double-acting cylinder mounted in said flange at a point nearer to the drum axis than the fulcrum of said arm, the movement of the operative end of said cylinder towards the transverse plane of symmetry of the drum causing the arm to move away from the drum axis so that the outer end of said arm, by co-acting with said pivoted finger, engages the bead of the tire carcass somewhat like a pair of tongs.

BACKGROUND OF THE INVENTION

There is described in the co-pending application Ser. No. 617,658, now abandoned in favor of applicant's continuation application Ser. No. 28,281, filed Apr. 22, 1970, entitled "Tire Building Machine" a drum for making radial carcass tires which comprises two flanges equipped with bead-clamping means for securing between these flanges the carcass to be shaped, another pair of flanges to which two or more pairs of arms are pivoted, the arms of each pair crossing each other and having their outer ends pivoted in turn to a carcass shaping sector, the assembly further comprising an axial shaft formed with driving screw-threads adapted to move said first pair of flanges or said second pair of flanges towards or away from each other respectively.

In the drum structure described and illustrated in the co-pending application No. 617,658, now abandoned in favor of applicant's continuation application Ser. No. 28,281, filed Apr. 22, 1970, entitled "Tire Building Machine" the bead clamping means associated with and carried by each flange consist of an annular set of radial sectors forming a peripheral groove provided with spring means and adapted to be expanded in the radial direction. This device actuated by a pneumatic or inflatable tube is adequate for the production of tires for passenger cars, which incorporate textile fabric carcass plies.

SUMMARY OF THE INVENTION

In the present invention applicable more particularly to heavy-duty or truck tires the bead clamping means consist, for each flange carrying these means, of an annular set of pivoted arms each formed with an outer or free end bent radially away from the drum axis, and provided with a pivoted finger formed with a forked outer end resiliently urged away from the drum axis by a spring reacting against the arm, and a link connecting said arm to the movable end of a double-acting cylinder mounted in said flange at a position nearer to the drum axis than the fulcrum of said arm, the movement of said cylinder towards the transverse plane of symmetry of the drum causing said arm to move away from the drum axis, whereby the end of said arm co-acts with the finger pivoted thereto engages the bead of the tire carcass somewhat in the fashion of a pair of tongs.

This invention is also concerned with specific arrangements whereby the drum can be adjusted for making a tire having the desired dimensions, namely the developed width of the tire, as well as the diameter and width of the finished tire.

BRIEF DESCRIPTION OF THE DRAWING

The features and advantages of this invention will appear more completely from the following description given by way of illustration but not of limitation with reference to the accompanying drawings in which the tire making drum is shown in radial section in a plane comprising the drum axis. In the drawings:

FIG. 1 shows the drum in its inoperative condition and adjusted for receiving the carcass to be shaped, shown in dash lines in the upper portion of the figure;

FIG. 2 shows the drum after the carcass to be shaped has been fitted and gripped thereon;

FIG. 3 shows the drum at the end of the step in which the two pairs of flanges have been moved concomitantly towards each other so as to give to the carcass being shaped the diameter of the finished tire to be made;

FIG. 4 shows the drum after the bead bending flanges alone have been moved towards each other for completing the carcass shaping operation in which the carcass is brought to its final width;

FIG. 5 shows the drum after the bead clamping means have been released and the sector control flanges have been moved away from each other to commence the release of the completed carcass;

FIG. 6 shows the drum upon completion of the movement of the pair of flanges away from each other to fully release the carcass and after the complete mechanism has been reset to its initial position shown in FIG. 1 for receiving a fresh carcass blank and commencing the shaping of a tire of same type and dimensions.

DESCRIPTION OF THE PREFERRED EMBODIMENT

The drum assembly is mounted on a hollow shaft 1 having one end suitably shaped for driving and fitting engagement with the spindle 2 of the tire making machine. Mounted in said hollow shaft 1 by means of suitable radial and thrust bearings is an axial shaft 3 formed with a plurality of screw-threaded portions adapted, when the shaft 3 is rotatably driven through a splined end 4, to cause the axial translation of four nuts 5, 5a, 6 and 6a disposed by pairs on either side of the transverse plane of symmetry of the drum. The ratio of the pitch of nuts 5 and 5a to that of nuts 6 and 6a is calculated to properly proportion the movements of the beads and bead wires of the carcass to be shaped with respect to the distance from the outer edge of sectors 8 to the drum axis.

All the component elements of this drum are symmetrical in relation to a transverse plane of symmetry and therefore only the left-hand half of the assembly illustrated in each figure will be described in order to simplify the disclosure.

When the screw-threaded shaft 3 is rotated, the nut 6, flange 9, links 7 and 7a pivoted on this flange 9 and the shaping sector 8 are moved towards or away from the above-mentioned transverse plane of symmetry of the drum. During this rotation the other nut 5 carries along a driver 10 carrying an adjustment screw 11 adapted to engage and drive another flange 12.

Mounted on the flange 12 is a fluid-operated actuator 13 which, when supplied with fluid under pressure through suitable and known circuit means (not shown) urges a pair of links 14 pivotally connected to arms 15 towards the carcass 26, as shown in FIG. 2. Loading the carcass 26 in the machine comprises fitting a metallic support into the entire inner portion of the carcass, i.e. against the inner wall of the cylindrical shaped plies and the in-turned wall of beads 27. To accommodate this shaped wall of the beads the arm 15 carries a finger 16 pivoted thereon by means of a pivot pin 17 shifted outwards with respect to the bead 27, this finger 16 when free being urged away from the transverse plane of symmetry of the drum by a spring 18. The finger 16 is formed with a forked outer or bead-engaging end, as shown.

When the arm 15, during its movement about its pivot pin 19, moves away from the axis of carcass 26, the forked end of finger 16 engages the underside of bead 27 of carcass 26; then, while rotating about its pivot pin 17, this finger 16 compresses the spring 18 and clamps the bead laterally against the end of arm 15. Thus, a concentric clamping action is produced throughout the developed length of the inner contour of the bead and throughout the contour of its cross-sectional profile.

A double-acting cylinder 20 controlled by adequate and known circuit means (not shown) comprises a piston rod 22 carrying on its screw-threaded outer end a pair of adjustment nuts 23 and 23a, and reacts against a stationary flange 21 solid with the hollow shaft 1. When actuated, this cylinder is adapted to move the flange 12 and arms 15 and therefore change the distance from the bead-clamping device to the transverse plane of symmetry of the drum.

The operative end of each arm 15 is pivotally connected at 24 to a metallic member 25 consisting of a spring blade secured to the shaping sector 8. A sheet of elastic material, such as molded rubber, covers this assembly and is secured to the end of arm 15 and to the sector 8 by means of a central rib. The outer surface of this elastic sheet is unbroken and smooth.

The above-described carcass shaping drum operates as follows:

In its inoperative position the drum 1 (FIG. 1) is adjusted for shaping a tire carcass 26 having a width L into a tire having a diameter D and a width B. In this position the screw-threaded shaft 3 is set in the angular position releasing the sectors 8 towards the drum axis, and the flanges carrying the bead clamping means are urged by the piston rod 22 of double-acting cylinder 20 (supplied with fluid for operating in the compression direction) until the outer adjustment nut 23a engages the fixed flange 21.

The operation of actuators 13 is attended by the clamping of the carcass beads 27 and by a rotation of said screw-threaded shaft 3 until the adjustment screws 11 of drivers 10 engage the bead-clamping flanges 12, so that the shaping sectors 8 contact the support 25 of carcass 26, as shown in FIG. 2. Under these conditions the side wall rubber sheets can be laid upon the thus positioned carcass.

While releasing the cylinders 20 the rotational movement of screw-threaded shaft 3 is continued, thus causing the screws 11 of drivers 10 to drive the bead-clamping flanges 12 towards the transverse plane of symmetry of the drum until the carcass radius is increased to correspond to the desired value D of the diameter of the tire to be produced. In the position thus obtained and as illustrated in FIG. 3, the width of the carcass being shaped assumes a value A.

By subsequently supplying fluid under pressure to the cylinders 20 but in the expansion direction the bead clamping flanges 12 are moved towards each other until the adjustment nut 23 of piston rod 22 of cylinder 20 abuts against the fixed flange 21. The width of the tire carcass will then have the value B of the finished tire while preserving the diameter D, the screw-threaded shaft 3 being left free while the flanges 9 controlling the shaping sectors 8 remain stationary. In this position shown in FIG. 4 the tire carcass 26 is shaped completely. The tire making operation is completed by laying the carcass cushion, the breaker and the tread, turning and applying the side wall rubber sheets, and rolling the side wall rubber from the bead base to the tread base.

The only step to be performed for completing the operation consists in releasing the finished tire. This release step is started as shown in FIG. 5 by operating the actuators 13 in the opposite or expansion direction, whereby the beads 27 of carcass 26 are released from the bead clamping means 15, 16, and then the screw-threaded shaft 3 is rotated in the direction to cause the movement of the sector control flanges 9 away from each other while discontinuing the supply of pressure fluid to cylinder 20; thus, flanges 12 are released and can commence their free movement away from each other, under the control of the resilient action of the elastic support 25.

By rotating the screw-threaded shaft 3 until the sectors 8 are released towards the drum axis while supplying pressure fluid to cylinders 20 in the proper direction until the outer adjustment nuts 23a of piston rod 22 abuts against the fixed flange 21, the position shown in FIG. 6 is obtained wherein the finished tire 28 is fully released and the drum having resumed the condition illustrated in FIG. 1 is ready for producing and shaping another tire of same type and dimensions.

The above-described drum may be adjusted for shaping a tire having the desired dimensions, such as the developed width L, or the width of the carcass to be shaped, as well as the diameter D and the width B of the finished tire.

Thus, by adjusting the screw 11 and the nut 23a of cylinder 20, the width L of the carcass 26 to be shaped can be preset to the desired value.

Besides, by properly determining the number of revolutions performed by the screw-threaded shaft 3, the diameter D of the finished tire can also be adjusted at will.

Finally, adjusting the nut 23 will set the width B of the finished tire.

It will be readily occur to anybody conversant with the art that although a specific form of embodiment of this invention has been shown and described herein, various modifications and variations may be brought thereto without departing from the spirit and scope of the invention as set forth in the appended claims.

I, therefore, particularly point out and distinctly claim as my invention:

1. A tire building machine comprising an expansible drum, a plurality of generally axially extending pivotally mounted arms connected at their distal ends to each end of said drum, and means to pivot said arms uniformly radially to expand and contract the ends of said drum.

2. A tire building machine as set forth in claim 1 wherein each arm includes a substantially radially extending distal portion connected to said drum to form therewith a bead receiving shoulder.

3. A tire building machine as set forth in claim 2 including means to move said plurality of arms at each end of said drum axially toward and away from each other symmetrically to set the bead receiving shoulder width during conversion of said drum from a substantially cylindrical shape to a toric shape.

4. A tire building machine as set forth in claim 3 including a plurality of internal non-yielding supports for said drum, and means to move said supports radially in a predetermined ratio with respect to the axial movement of said arms.

5. A tire building machine as set forth in claim 1 including a double acting piston-cylinder assembly operative to pivot each plurality of arms.

6. A tire building machine comprising an expansible drum, a plurality of pivotally mounted arms connected at their distal ends to each end of said drum, and means to pivot said arms uniformly radially to expand and contract said drum, each arm including a substantially radially extending distal portion connected to said drum to form therewith a bead receiving shoulder, each arm including a bead gripping finger pivoted thereto and cooperating with said shoulder to clamp a tire bead thereagainst.

7. A tire building machine as set forth in claim 6 wherein each finger includes a forked bead engaging distal end portion operative to cause each finger to pivot toward said shoulder as the respective arm is pivoted outwardly and the finger engages the bead.

8. A tire building machine as set forth in claim 7 including spring means urging each finger away from the respective bead receiving shoulder, said spring means being compressed as the finger engages such bead and pivots toward the shoulder.

9. A tire building machine comprising an expansible drum, a plurality of pivotally mounted arms connected at their distal ends to each end of said drum, means to pivot said arms uniformly radially to expand and contract said drum, means to move said plurality of arms at each end of said drum axially toward and away from each other symmetrically to set the shoulder width during conversion of said drum from a substantially cylindrical shape to a toric shape, a plurality of internal non-yielding supports for said drum, and means to move said supports radially in a predetermined ratio with respect to the axial movement of said arms, said last mentioned means comprising a drive screw having four threaded sections, two of the same pitch but opposite hand being operative to move said arms axially as aforesaid and two of the same pitch but opposite hand being operative to move said supports radially.

10. A tire building machine as set forth in claim 9 including a crossed arm linkage interconnecting said drive screw and said supports.

11. A tire building machine as set forth in claim 9 including means to move said arms toward and away from each other independently of said screw and thus said internal supports to provide variable movement of the ends of the drum when said drive screw is moving said threaded sections at a constant rate.

12. A tire building machine as set forth in claim 11 wherein said last mentioned means comprises piston-cylinder assemblies for each plurality of pivotally mounted arms.

13. A tire building machine comprising an expansible drum, a plurality of pivotally mounted arms connected at their distal ends to each end of said drum, means to pivot said arms uniformly radially to expand and contract said drum, said last mentioned means including a double acting piston-cylinder assembly operative to pivot each plurality of arms, said arms being pivoted to the cylinder of said piston-cylinder assembly, and a link interconnecting the piston and each arm.

References Cited
UNITED STATES PATENTS

| | | | |
|---|---|---|---|
| 3,075,570 | 1/1963 | Garver | 156—400 |
| 3,560,302 | 2/1971 | Missioux | 156—415 |
| 2,149,604 | 3/1939 | Johnson | 156—419 |
| 3,485,692 | 12/1969 | Frazier | 156—415 |

STEPHEN C. BENTLEY, Primary Examiner

U.S. Cl. X.R.

156—416, 417